(12) United States Patent
Ishii et al.

(10) Patent No.: US 7,726,024 B2
(45) Date of Patent: Jun. 1, 2010

(54) MANUFACTURING METHOD FOR A HEAT EXCHANGER

(75) Inventors: Katsuya Ishii, Nagoya (JP); Hirokazu Hashimoto, Anjo (JP); Yuuichi Aoki, Chita-gun (JP); Kazuo Itoh, Anjo (JP)

(73) Assignee: Denso Corporation, Kariya (JP)

( * ) Notice: Subject to any disclaimer, the term of this patent is extended or adjusted under 35 U.S.C. 154(b) by 548 days.

(21) Appl. No.: 11/637,846

(22) Filed: Dec. 12, 2006

(65) Prior Publication Data

US 2007/0114268 A1 May 24, 2007

Related U.S. Application Data

(62) Division of application No. 10/857,697, filed on May 28, 2004, now abandoned.

(30) Foreign Application Priority Data

| May 29, 2003 | (JP) | ............................. 2003-153105 |
| Sep. 24, 2003 | (JP) | ............................. 2003-332291 |
| Apr. 2, 2004 | (JP) | ............................. 2004-110372 |

(51) Int. Cl.
*B23P 15/26* (2006.01)
(52) U.S. Cl. .............................. 29/890.038; 29/890.03; 29/890.043; 29/890.045; 29/890.047; 165/148; 165/152; 165/153; 165/177; 165/178; 228/110.1
(58) Field of Classification Search ............ 29/890.038, 29/890.047, 890.043; 165/153, 173, 178; 408/265; 228/110.1
See application file for complete search history.

(56) References Cited

U.S. PATENT DOCUMENTS

| 2,488,627 A | 11/1949 | Hisey |
| 2,695,446 A | 11/1954 | Meyer |
| 2,735,698 A | 2/1956 | Brinen |
| 3,319,984 A * | 5/1967 | Jones et al. .................. 403/265 |
| 4,839,950 A * | 6/1989 | Stroup ................... 29/890.047 |

(Continued)

FOREIGN PATENT DOCUMENTS

JP       43-19677       8/1943

(Continued)

OTHER PUBLICATIONS

Office action dated Jun. 2, 2009 in corresponding Japanese Application No. 2004-110372.

*Primary Examiner*—Rick K Chang
(74) *Attorney, Agent, or Firm*—Harrison, Dickey & Pierce, PLC (57) ABSTRACT

In a heat exchanger, a core portion includes a plurality of plate fins each shaped like a flat plate and a plurality of tubes in which a fluid flows and each of which is inserted into each of the plate fins to be mechanically bonded thereto. Further, an end portion in a longitudinal direction of each of the tubes is bonded to a header plate which constructs a part of a header tank. The manufacturing method for this heat exchanger includes inserting the tube into the plate fins; expanding the tube to attach the plate fins; connect the tube into the header plate; and vibrate the tube with respect to the plate while applying a load to the tube in the direction of the header plate.

9 Claims, 7 Drawing Sheets

U.S. PATENT DOCUMENTS

| | | | |
|---|---|---|---|
| 5,067,235 A * | 11/1991 | Kato et al. | 29/890.043 |
| 5,190,101 A | 3/1993 | Jalilevand et al. | |
| 5,457,885 A | 10/1995 | Ohashi et al. | |
| 5,762,133 A | 6/1998 | Dion | |
| 5,785,119 A | 7/1998 | Watanabe et al. | |
| 6,263,570 B1 | 7/2001 | Cazacu | |
| 6,971,444 B2 | 12/2005 | Lamich | |

FOREIGN PATENT DOCUMENTS

| | | |
|---|---|---|
| JP | 62-75392 | 5/1987 |
| JP | 01-155198 | 6/1989 |
| JP | 10-50758 | 2/1998 |
| JP | 11-101593 | 4/1999 |
| JP | 2001-246479 | 9/2001 |
| JP | 2002-340490 | 11/2002 |

* cited by examiner

MANUFACTURING METHOD FOR A HEAT EXCHANGER

CROSS-REFERENCE TO RELATED APPLICATIONS

This application is a divisional of U.S. patent application Ser. No. 10/857,697 filed on May 28, 2004. This application is based on Japanese Patent Applications No. 2003-153105 filed on May 29, 2003, No. 2003-332291 filed on Sep. 24, 2003, and No. 2004-110372 filed on Apr. 2, 2004, the disclosure of which is incorporated herein by reference.

FIELD

The present invention relates to a heat exchanger having a core portion in which plate fins are mechanically connected to a tube by expanding the tube, and a method for manufacturing the same. The present invention is suitably used for a heater core for a heating apparatus and a radiator for cooing an engine.

BACKGROUND

The statements in this section merely provide background information related to the present disclosure and may not constitute prior art.

In a plate fin type heat exchanger proposed in JA-A-2002-340490, plate fins are mechanically connected to a tube by expanding the tube. In order to enhance performance, a flat tube having a flat cross section is used, and a radius of curvature on an inner wall side at an end in a direction of long diameter of the cross section is at least ½ of a size in a direction of short diameter on the inner wall side nearly at the center in the direction of long diameter. With this, when the tube is expanded, the whole outer periphery of the tube can be nearly uniformly expanded to prevent the tube from being cracked or broken to enhance durability.

However, an end portion in a longitudinal direction of tube is bonded to a header plate (core plate) by use of brazing (soldering) or an adhesive made of thermosetting resin material. For this reason, a furnace at high temperature is required and energy consumption is increased in a manufacture. In view of the fact that the reduction of $CO_2$ is strongly required in recent years so as to prevent global warming, the inventors think that the reduction of energy consumption is extremely important.

SUMMARY

In view of the problems described above, an object of the present invention is to enable the bonding of an end portion in a longitudinal direction of a tube to a header plate without a furnace of high temperature, in a heat exchanger in which plate fins are mechanically bonded to the tube and in a method for manufacturing the same.

According to the present invention, a heat exchanger has a core portion (110) including a plurality of plate fins (111) each shaped like a flat plate, and a tube (112) in which fluid flows and which is inserted into the plate fins (111) to be mechanically connected thereto. An end portion of the tube (112) in the longitudinal direction of the tube (112) is bonded to a header plate (113) which constructs a part of a header tank (120). In this heat exchanger, the tube (112) and the header plate (113) are bonded to each other by a solid bonding. This can provide a heat exchanger for eliminating the need for providing a furnace of high temperature.

Preferably, the tube (112) has a flange portion (112b) expanded and bent to the surface of the header plate (113) along the whole periphery on the tip side of an insertion portion (112a) inserted into a tube hole portion (113a) provided in the header plate (113). A portion where the tube (112) and the header plate (113) are bonded to each other has an abutting portion (114) where the flange portion (112b) abuts on the header plate (113). This can facilitate the solid bonding and can stably bond the tube (112) to the header plate (113).

For example, the flange portion (112b) is formed in such a way as to be expanded and bent nearly 90 degrees along the surface of the header plate (113). This can prevent the end portion of the tube (112) in the longitudinal direction of the tube (112) from protruding into the header tank (120) and hence can reduce a flowing resistance of the fluid flowing in the header tank (120).

Preferably, a tapered portion (113b) is formed on a side of the flange (112b) in the tube hole portion (113a). In this case, the tube (112) is formed along the tapered portion (113b) and is bonded to the header plate (113) also in a portion where the tube (112) abuts on the tapered portion (113b). This can increase the bonding area of the tube (112) and the header plate (113) to provide a heat exchanger (100) with the further stabilized bonding.

More preferably, at a predetermined position of an outer peripheral portion of the flange portion (112b), a stress relieving portion (112d) is formed. The stress relieving portion (112d) is for relieving a tensile stress generated in a peripheral direction when the flange portion (112b) is formed. This can prevent the flange portion (112b) from being cracked when the flange portion (112b) is formed and secure the sufficient area of the flange portion (112b). Moreover, the tube (112) can be bonded to the header plate (113) while absorbing a clearance (δ) between the tube (112) and the tube hole portion (113a). For example, the stress relieving portion (112d) can be formed as a cut-out portion (112d) in which the outer peripheral portion of the flange portion (112b) is cut out in a circumferential shape.

Alternatively, on a side of the header plate (113) in a bonding portion where the tube (112) is bonded to the header plate (113), a protruding portion (113f) for reducing a contact area with the tube (112) side is formed. This can reduce the contact area of the tube (112) side and the header plate (113) and hence can increase a bearing stress even if a load applied in the solid bonding is decreased, thereby providing reliable bonding and preventing the deformation of the tube (112) and the header plate (113).

A first chamfered portion (113c) is formed on a side of the tube hole portion (113a) in which the tube (112) is inserted. This can improve the ease with which the tube (112) is inserted into the tube hole portion (113a). Moreover, a second chamfered portion (113g) is formed on a side of the flange portion (112b) in the tube hole portion (113a). Therefore, a space formed between the second chamfered portion (113g) and the flange portion (112b) absorbs a material flowed by a load applied to the header plate (113) when the flange portion (112b) is bonded to the header plate (113) in the solid bonding. Hence, this can restrict the flange portion (112b) from being reduced in thickness near its bent portion and can form the bent portion in a shape resistant to stress concentration and hence can enhance the strength of the flange portion (112b). In this invention, preferably, the tube (112) has a thickness that is in a range from 0.1 mm to 0.5 mm.

In a method for manufacturing a heat exchanger in accordance with the present invention, a tube (112) in which a fluid flows is inserted into a plurality of plate fins (111) each shaped like a flat plate and the tube (112) is expanded to make the plate fins (111) be mechanically bonded to the tube (112) to form a core portion (110). In a bonding of an end portion of the tube (112) in the longitudinal direction of the tube (112) to a header plate (113) forming a part of a header tank (120), while vibrating the tube (112) by a supersonic vibration in a direction in which a surface of an abutting portion (114) where the tube (112) abuts on the header plate (113) extends, a predetermined load is applied in a direction in which the tube (112) abuts on the header plate (113) to bond the tube (112) to the header plate (113) in a solid bonding. This can manufacture a heat exchanger (100) without use of a furnace of a high temperature and hence can reduce energy consumption in the manufacturing.

Preferably, the method for manufacturing the heat exchanger further includes a step of passing the tube (112) into a tube hole portion (113a) made in the header plate (113) and then bending the end portion in the longitudinal direction of the tube (112) along its whole periphery in such a way as to expand to a surface side of the header plate (113) to form a flange portion (112b) and to make the flange portion (112b) abut on the header plate (113), in a forming step of the abutting portion (114). This can eliminate the need for increasing the position accuracy of a vibrator (220) and the tube (112) when the supersonic vibration is applied, and can realize stable bonding necessary for hermetically holding the fluid flowing in the tube (112).

Further areas of applicability will become apparent from the description provided herein. It should be understood that the description and specific examples are intended for purposes of illustration only and are not intended to limit the scope of the present disclosure.

DRAWINGS

Other objects, features, and advantages of the present invention will become apparent from the following detailed description made with reference to the accompanying drawings, in which.

DETAILED DESCRIPTION

The following description is merely exemplary in nature and is not intended to limit the present disclosure, application, or uses.

First Embodiment

The first embodiment of the present invention will be described with reference to FIG. 1 to FIG. 4. In the first embodiment, a heat exchanger of the present invention is applied to a heater core 100 for a heating apparatus that heats air for air conditioning by using a hot water (inside fluid).

Figure 1:
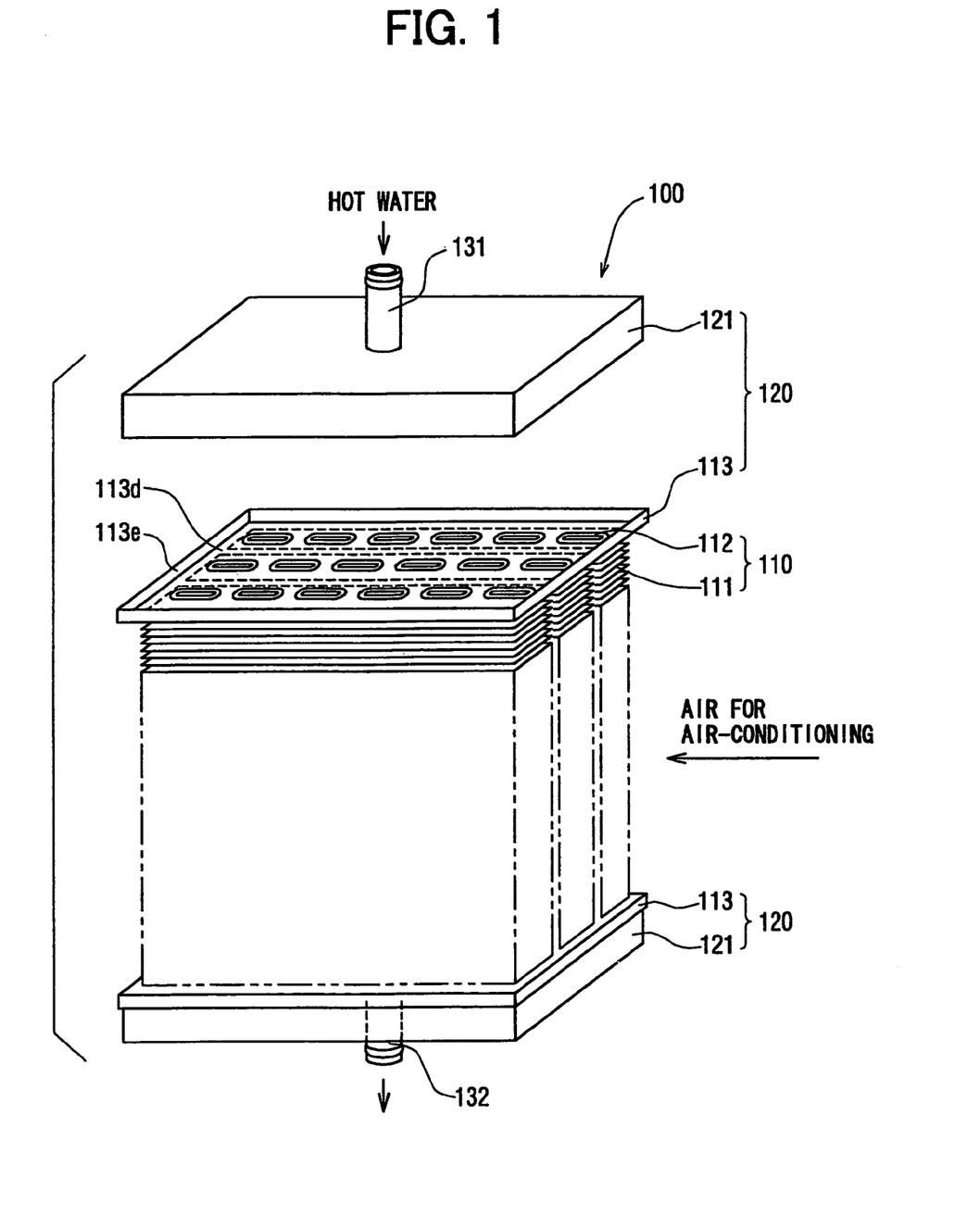
FIG. 1 is an exploded perspective view showing a general construction of a heater core of the present invention.

First, the basic construction of the heater core 100 will be described with reference to FIG. 1. The heater core 100 includes a core portion 110 for exchanging heat and two header tanks 120 arranged on end sides in a longitudinal direction of a tube 112. The material of the respective parts of the heater core 100 to be described below is aluminum or aluminum alloy.

The core portion 110 includes plate fins 111 and tubes 112. The plate fin (hereinafter referred to as fin) 111 is a band-shaped member having a thin thickness (here, assumed to be 25 μm) and the fins 111 are laminated at a predetermined pitch (fin pitch). A plurality of sets (three sets) of assemblies of the plural laminated fins 111 are used. Each fin 111 has plural insertion holes 111a (FIG. 4) arranged in a longitudinal direction of the fin 111.

The tube 112 is a flat tube having a thin thickness (for example, 0.2 mm in thickness) and a flat cross section. The tube 112 is inserted into the insertion hole 111a of each fin 111, and the direction of long diameter in a cross section of the tube 112 is pointed in the longitudinal direction of the fin 111. The tube 112 is expanded and press-fitted to the fin 111, whereby the tube 112 is mechanically bonded to the fin 111.

Assemblies of the fins 111 and the tubes 112 bonded to each other in this manner are arranged in such a way as to be adjacent to each other on the longitudinal side of the fin 111 (for example, 3 rows). Moreover, both end portions in the longitudinal direction of the tube 112 are bonded to the header plates 113. The header plate 113 is a plate-shaped member forming a part of the header tank 120 together with a tank body 121 to be described below. In the header plate 113, an erect edge portion 113e is formed on the outside periphery of a rectangular plane portion 113d that has a size larger than an outer dimension of the core portion 110 in a case where the core portion 110 is projected from the longitudinal direction of the tube 112.

In the header plate 113, tube holes 113a corresponding to the tubes 112 (FIG. 2 to FIG. 4) are formed. The end portion in the longitudinal direction of each tube 112 is inserted into the tube hole portions 113a, whereby the tubes 112 are bonded to the header plate 113. The present invention is characterized by the bonding structure of the tube 112 and the header plate 113 and a method for manufacturing the same, which will be described later in detail.

The tank bodies 121 are bonded to both of the header plates 113 to form the header tanks 120. The tank body 121 is a box-shaped part open at the side of the header plate 113. The opening side of the tank body 121 is inserted inside the erect edge portion 113e of the header plate 113 and is welded to the header plate 113 along the entire periphery of the tank body 121. An inlet pipe 131 is bonded to one tank body 121 (e.g., on the upper side in FIG. 1). An outlet pipe 132 is bonded to another tank body 121 (e.g., on the lower side in FIG. 1). Both of the pipes 131, 132 communicate with the insides of the header tanks 120, respectively.

In the heater core 100 formed in this manner, hot water flows through the tubes 112 via one header tank 120 from the inlet pipe 131 and is collected by another header tank 120 and flows out of the outlet pipe 132. The hot water flowing through the tubes 112 exchanges heat with air for air conditioning supplied from the outside in the direction of the long diameter in the cross section of the tube 112 to heat the air for air conditioning. At this time, the heat exchange is accelerated by the fins 111.

A method for manufacturing the heater core 100 will be described with reference to FIG. 2 to FIG. 4. First, predetermined pieces of fins 111 are laminated at predetermined intervals by using a laminating jig (not shown) as a guide. The tubes 112 are inserted into the respective insertion holes 111a and then a tube expanding tool (not shown) is inserted into each of the tubes 112 to expand the tubes 112 and to press-fit the tube 112 to the fin 111 (step of assembling core portion).

Figure 2:
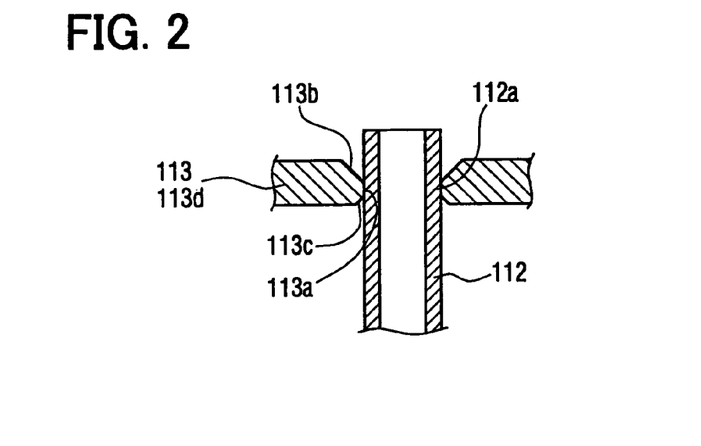
FIG. 2 is a cross-sectional view showing a step of pounding a header plate in a first embodiment of the present invention.

Next, as shown in FIG. 2, the end portion in the longitudinal direction of the tube 112 is inserted into the tube hole portion 113a of the header plate 113 and the header plate 113 is pounded by a press (not shown) so as to project the tube 112 to a side opposite to an insertion side. At this time, on the tube 112, an insertion portion 112a abutting on the tube hole portion 113a is formed. A chamfered portion 113c is previously formed on the tube insertion side of the tube hole portion 113a and a tapered portion 113b is previously formed on a side opposite to the insertion side (i.e., the side of the flange portion 112b) (step of pounding a header plate).

Figure 3A:
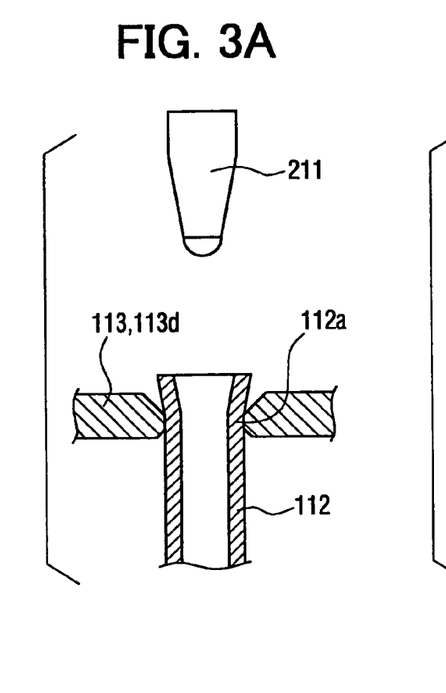
FIG. 3A is a cross-sectional view showing a step of preliminarily expanding the tip portion of a tube in the first embodiment of the present invention.
Figure 3B:
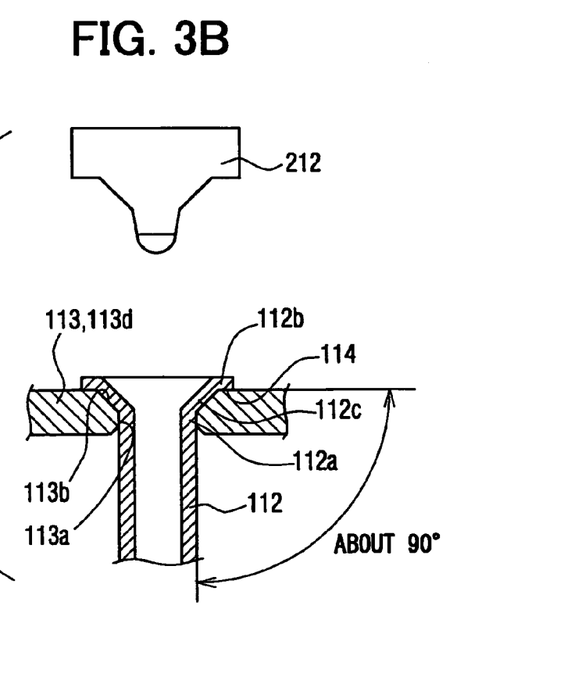
FIG. 3B is a cross-sectional view showing a step of finally expanding the tip portion of the tube.

Next, as shown in FIGS. 3A and 3B, the end portion in the longitudinal direction of the tube 112 protruding from the header plate 113 is expanded. That is, first, the end portion of the tube 112 is expanded in the shape of a bell at a predetermined angle by a preliminary tube expanding jig 211 (FIG. 3A). Further, the tip portion of the tube 112 is bent along the plane portion 113d of the header plate 113 in such a way as to expand nearly at 90 degrees by a tube expanding jig 212 (FIG. 3B). With this, a flange portion 112b is formed at the tip portion of the tube 112, whereby an abutting portion 114 where the flange portion 112b abuts on the header plate 113 (plane portion 113d) is formed. Further, an expanded portion 112c is formed between the insertion portion 112a of the tube 112 and the flange portion 112b by the tube expanding jig 212, and abuts on the tapered portion 113b (step of expanding tube).

Figure 4:
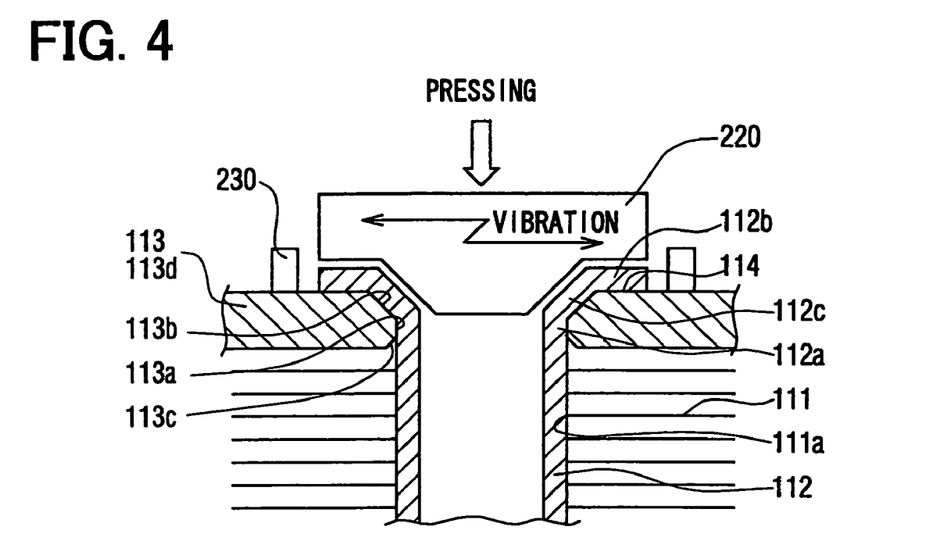
FIG. 4 is a cross-sectional view showing a step of bonding the tube to the header plate in a solid bonding in the first embodiment of the present invention.
Figure 5A:
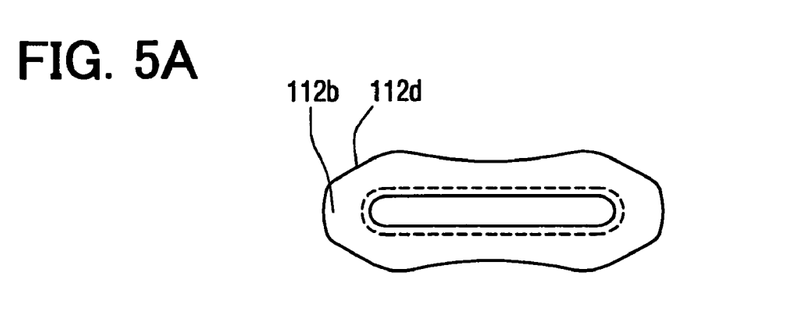
FIGS. 5A and 5B are cross-sectional views showing the tip portion of a tube and a header plate in a second embodiment of the present invention.
Figure 5B:
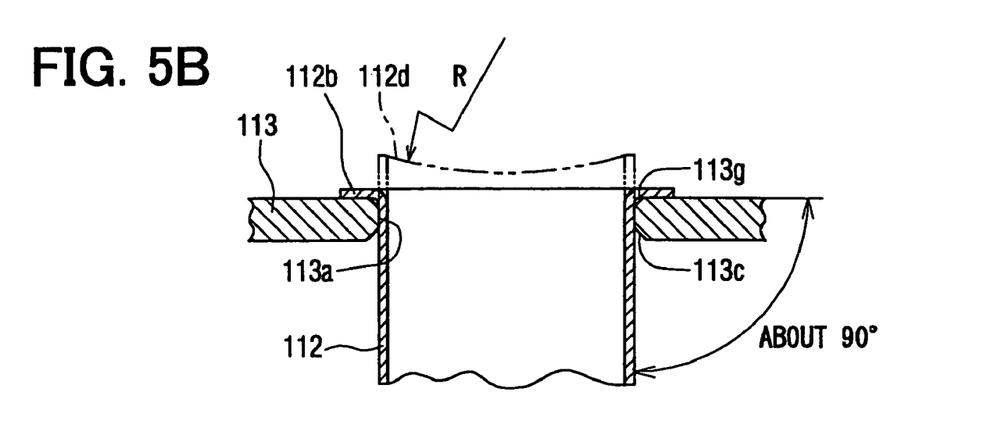

Next, as shown in FIG. 4, the tube 112 and the header plate 113 are bonded to each other in a solid phase by a vibrator 220. The vibrator 220 has an external shape along the flange portion 112b and the expanded portion 112c. The vibrator 220 vibrates in a direction in which the surface of the abutting portion 114 extends (in left-right direction in FIG. 4) and at the same time applies a predetermined load to the tube 112 in the direction that makes the flange portion 112b abut on the header plate 113. Here, the vibration conditions of the vibrator 220 are as follows: frequency is 20 kHz; amplitude is from 20 μm to 60 μm; and pressure is from 50 kg to 100 kg. The working time per one tube of the vibrator 220 is from 0.2 sec to 0.5 sec. A heater (high frequency resistance heating) 230 as a heating unit is mounted near the abutting portion 114 where the flange portion 112b abuts on the header plate 113.

The flange portion 112b and the expanded portion 112c of the tube 112 are vibrated in the left-right direction in FIG. 4 by the action of this vibrator 220. At this time, the tube 112 and the header plate 113 have their oxide films removed in the abutting portion 114 and the tapered portion 113b, and are heated to temperatures (from 200 to 300° C.) between the recrystallization temperature and the melting point of the part by frictional heat and the heat of the heater 230 and further have pressure applied thereto, thereby being bonded to each other in the solid phase (step of bonding tube).

It is preferable that the thickness of the tube 112 is 0.1 mm or more so as to secure a basic strength as the heater core 100 and is 0.5 mm or less so as to transmit vibrations from the vibrator 220 to the side of the header plate 113 without attenuation. The two tank bodies 121 to which the inlet pipe 131 and the outlet pipe 132 are previously welded are fitted inside the erect edge portion 113e of the header plates 113, respectively, and then are welded along the whole periphery by laser welding (step of welding tank).

In the first embodiment of this invention, in the heater core 100 having the core portion 110 including the fins 111 and the tubes 112 that are mechanically bonded to each other, the tube 112 and the header plate 113 are bonded to each other in the solid phase. For this reason, the heater core 100 can be formed without necessitating a furnace of high temperature. Therefore, energy consumption can be reduced in the manufacture, and equipment cost for a furnace can be reduced.

To be specific, in the solid bonding, the flange portion 112b is formed in the tube 112 and is bonded to the header plate 113 at the abutting portion 114 where the flange portion 112b abuts on the header plate 113. Therefore, when the vibrator 220 applies supersonic vibrations to the tube 112, positioning accuracy between the vibrator 220 and the tube 112 is eliminated and the solid bonding can be easily performed. Moreover, the inside hot water can be easily hermetically held, and the tube 112 can be stably bonded to the header plate 113.

Because the flange portion 112b is formed, it can prevent the end portion in the longitudinal direction of the tube 112 from protruding into the header tank 120, and thereby reducing the flowing resistance of the hot water flowing inside the header tank 120 and improving performance as the heater core 100.

Further, in the solid bonding, the heater 230 heats the tube 112 and the header plate 113 near the abutting portion 114. For this reason, the stabilization of temperature condition necessary for the solid bonding can be easily performed, whereby the tube 112 can be stably bonded to the header plate 113.

Still further, the tapered portion 113b is formed at the tube hole portion 113a of the header plate 113. Moreover, the expanded portion 112c is formed in the tube 112 so that the tube 112 is bent along this tapered portion 113b. Hence, this can increase the bonding area of the tube 112 and the header plate 113 and can perform a further stable bonding.

Since the tube hole portion 113a is provided with the chamfered portion 113c, the inserting performance of the tube 112 into the tube hole portion 113a can be improved. Further, the tube 112 is a flat tube 12 having a flat cross section. Therefore, this flat tube 112 can enhance a heat transfer coefficient of hot water flowing in the tube 112 and can reduce a flow resistance to air for air conditioning flowing outside the tube 112 to enhance the heat exchange performance of the heater core 100.

In addition, the heating of the tapered portion 113b of the header plate 113 and the expanded portion 112c of the tube 112 by the heater 230 can be stopped according to the bonding strength at the abutting portion 114 due to the flange portion 112b.

Second Embodiment

Figure 6:
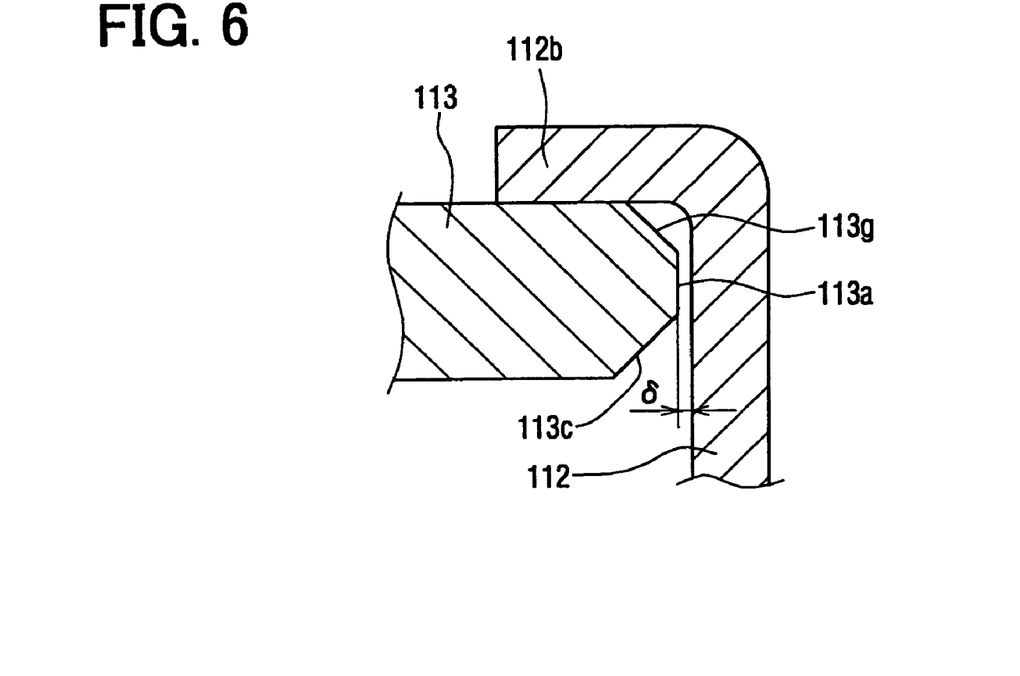
FIG. 6 is an enlarged cross-sectional view showing the vicinity of the bent portion of a flange portion in FIG. 5 before the solid bonding.
Figure 7:
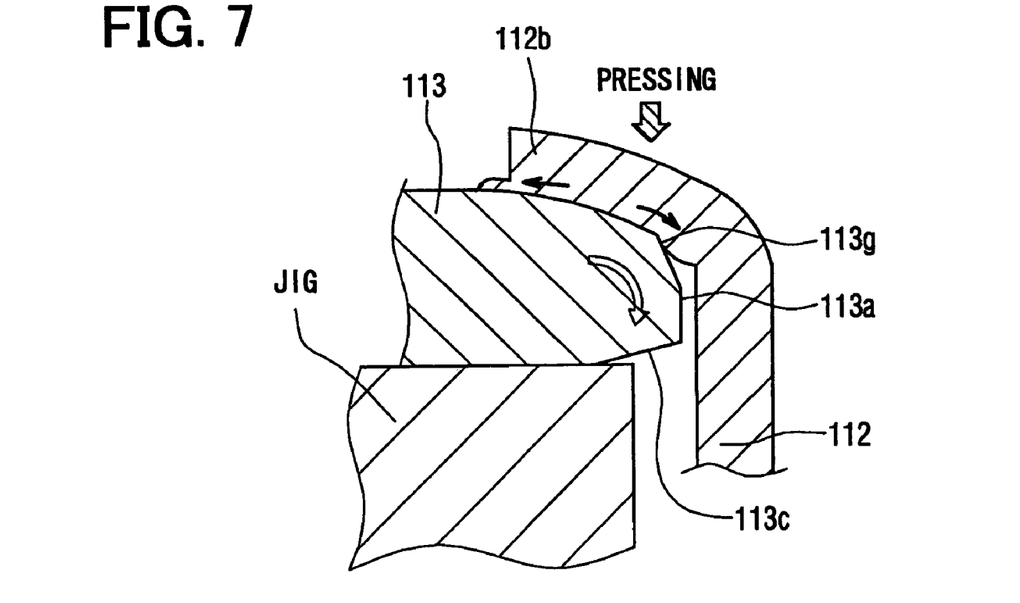
FIG. 7 is an enlarged cross-sectional view showing the vicinity of the bent portion of a flange portion in FIG. 5 after the solid bonding.

The second embodiment of the present invention will be shown in FIG. 5A to FIG. 7. In the second embodiment, the shape of the flange portion 112b of the tube 112 is changed in comparison with the first embodiment. That is, the shape of end portion in the longitudinal direction of the tube 112 before forming the flange portion 112b is changed. FIG. 6 is an enlarged sectional view to show the vicinity of the flange portion 112b in FIG. 5 in a state where the flange portion 112b abuts on the header plate 113, and FIG. 7 is an enlarged sectional view to show the vicinity of the flange portion 112b in FIG. 5 after the solid bonding of the flange portion 112b to the header plate 113 is performed.

Here, cut-out portions 112d are previously formed as stress relieving portions in predetermined portions along the entire periphery of the end portion in the longitudinal direction of the tube 112. To be more specific, in the cut-out portions 112d, the end portion of the tube 112 has a recess portion removed by a large radius of R in the direction of long diameter in the cross section of the tube 112. In the step of forming the tube 112, the end portion of the tube 112 is cut out (removed) in the vertical direction with respect to the surface of paper in FIGS. 5A and 5B by a cutter corresponding to a shape shown by a double dot and dash line in FIGS. 5A and 5B to form the cut-out portion 112d.

Moreover, a chamfered portion (corresponding to the first chamfered portion in this invention) 113c is formed on the side of the tube hole portion 113a to which the tube 112 is inserted and a chamfered portion (corresponding to the second chamfered portion in this invention) 113g is formed also on the side of the flange portion 112b of the tube hole portion 113a.

As is the case with the first embodiment, the end portion in the longitudinal direction of the tube 112 is inserted into the tube hole portion 113a and is expanded and bent approximately 90 degrees to form the flange portion 112b. Then, the tube 112 is bonded to the header plate 113 in a solid phase by the vibrator (not shown in FIGS. 5A and 5B).

Figure 8A:
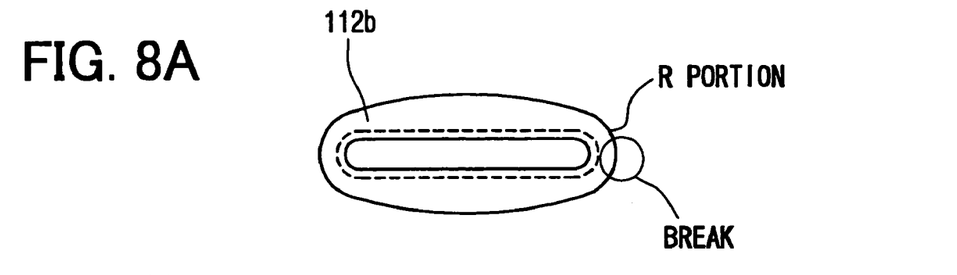
FIGS. 8A and 8B are comparative examples of the second embodiment shown in FIGS. 5A and 5B and are cross-sectional views in a case where R cut-out portions and chamfered portions are not formed.
Figure 8B:
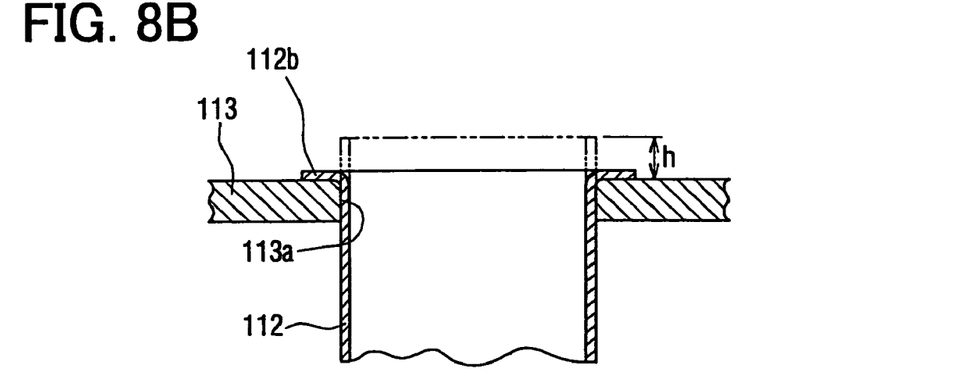

By forming the flange portion 112b on the tube 112, a clearance δ between the tube 112 and the tube hole portion 113a is absorbed in the solid bonding. For this reason, the area of the flange portion 112b needs to be increased. Hence, as shown in a comparative example shown in FIGS. 8A and 8B, the amount of protrusion (h) of the tube 112 is usually increased. However, when the amount of protrusion (h) is simply increased, a tensile stress generated at an R portion on the end side in the direction of long diameter of the flange portion 112b becomes large and the flange portion 112b is apt to be broken at the R portion. Hence, after all, the area of the flange portion 112b can not be increased.

Figure 9:
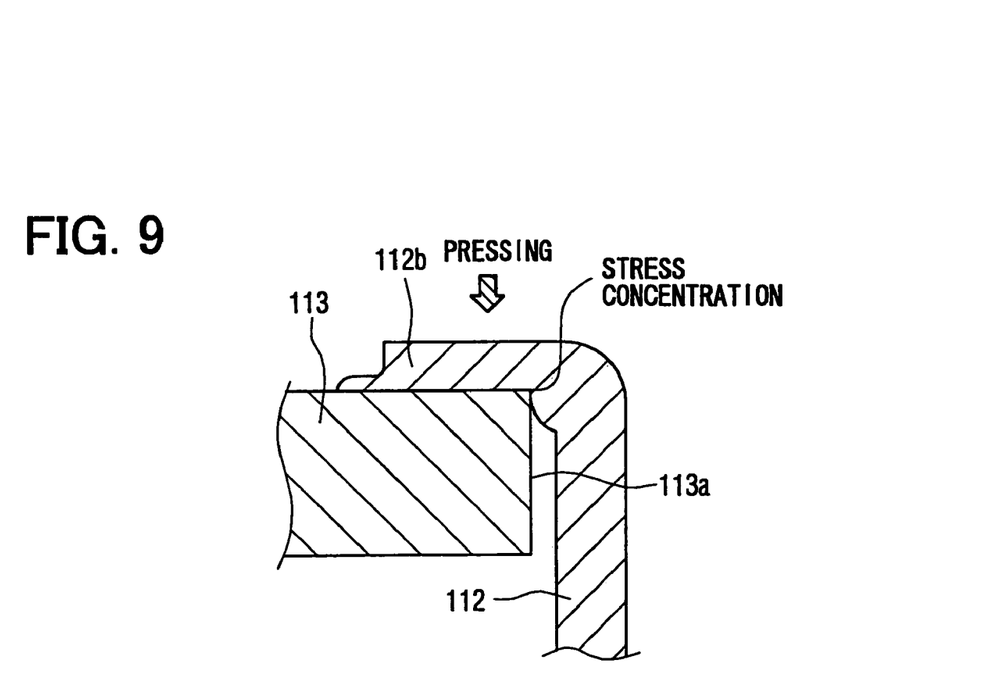
FIG. 9 is a comparative example of FIG. 7 and an enlarged cross-sectional view showing the vicinity of the bent portion of a flange portion after the solid bonding.

Further, by pressing the flange portion 112b onto the header plate 113 in the solid bonding, as shown in a comparative example in FIG. 9, the thickness of the flange portion 112b is reduced. In addition, when a portion of the tube hole portion 113a on a side of the flange portion 112b is formed in a sharp angle, the portion has stress concentrated thereon, which might reduce the strength of the flange portion 112b.

However, in the second embodiment, the cut-out portion 112d previously formed on the end portion in the longitudinal direction of the tube 112 can relieve the tensile stress generated in a circumferential direction of the cut-out portion 112d when the tube 112 is expanded and bent approximately 90 degrees to form the flange portion 112b. Hence, it can prevent cracks when the flange portion 112b is formed, and thereby sufficiently securing the area of the flange portion 112b. Accordingly, the clearance δ between the tube 112 and the tube hole portion 113a can be absorbed, and the tube 112 can be bonded to the header plate 113.

Moreover, the tube hole portion 113a is provided with the chamfered portions 113c and 113g. Hence, when the flange portion 112b is pressed into the header plate 113 by the solid bonding as shown in FIG. 7 from the state where the flange portion 112b abuts on the header plate 113 as shown in FIG. 6, the flowing material (shown by a white arrow in FIG. 7) of the header plate 113 when a portion near the tube hole portion 113a of the header plate 113 is deformed can be absorbed in a space formed between the chamfered portion 113c and the tube 112. Further, a load applied to the vicinity of the bent portion of the flange portion 112b is relieved to prevent the flange portion 112b form being reduced in thickness in the vicinity of the bent portion of the flange portion 112b. At this time, if the header plate 113 is deflected, the bonding performance for bonding the flange portion 112b to the header plate 113 is reduced. Therefore, a fixing member for fixing the bottom surface of the header plate 113 by a receiving jig is used. Alternatively, the deflection of the header plate 113 can be reduced by increasing the thickness of the header plate 113. Further, the flowing material (shown by a black arrow in FIG. 7) of the tube 112 when the tube 112 is pressed onto the header plate 113 can be absorbed in a space formed between the chamfered portion 113g and the flange portion 112b. As a result, it can restrict the flange portion 112b from being reduced in thickness and can form the flange portion 112b in a shape in which stress is difficult to be concentrated on the bent portion and hence can enhance the strength of the flange portion 112b.

Third Embodiment

Figure 10A:
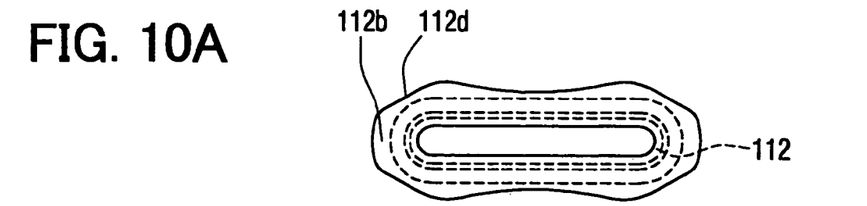
FIGS. 10A and 10B are cross-sectional views showing the tip portion of a tube and a header plate in a third embodiment of the present invention.
Figure 10B:
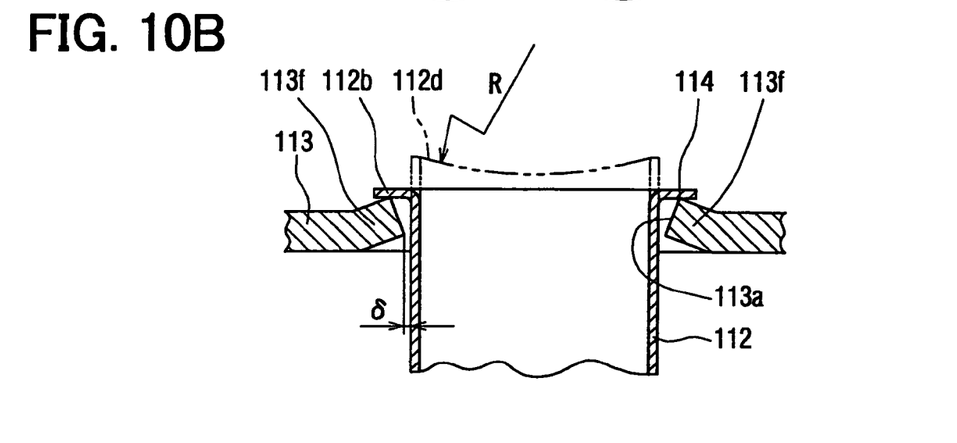

The third embodiment of the present invention will be shown in FIGS. 10A and 10B. In the third embodiment, the shape in the vicinity of the tube hole portion 113a of the header plate 113 is changed as compared with the above-described second embodiment.

Here, the header plate 113 is previously provided with a protruding portion 113f which reduces a contact area with the flange portion 112b in the abutting portion 114 where the flange portion 112b abuts on the header plate 113. The protruding portion 113f is formed in such a way as to raise the peripheral portion of the tube hole portion 113a of the header plate 113 to the end side in the longitudinal direction of the tube 112.

As in the case with the first embodiment described above, the end portion in the longitudinal direction of the tube 112 is inserted into the tube hole portion 113a and is expanded and bent nearly 90 degrees, thereby the flange portion 112b is formed. The tube 112 is bonded to the header plate 113 in the solid phase by the vibrator (not shown in FIG. 10).

When the flange portion 112b is bonded to the header plate 113 in the solid phase, a force to be applied thereto needs to be made smaller than a predetermined value to prevent the flange portion 112b and the header plate 113 from being deformed. However, when the force to be applied is simply reduced, the solid bonding cannot be surely performed. In this third embodiment, as described above, the header plate 113 is provided with the protruding portion 113f to reduce the contact area of the flange portion 112b with the header plate 113.

Therefore, even if the force to be applied in the solid bonding is reduced, a bearing stress can be increased and hence the solid bonding can be surely performed and the flange portion 112b and the header plate 113 can be prevented from being deformed. Further, the tube 112 can be bonded to the header plate 113 while absorbing the clearance δ between the tube 112 and the tube hole portion 113a. Still further, because the protruding portion 113f is formed, it can provide the same function as the chamfered portion 113c of the second embodiment and hence the inserting performance of the tube 112 to be inserted into the tube hole portion 113a can be improved.

Figure 11A:
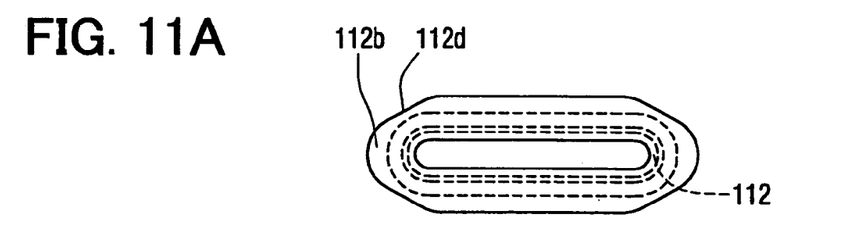
FIGS. 11A and 11B are cross-sectional views showing the tip portion of a tube and a header plate in a modified example 1 of the third embodiment.
Figure 11B:
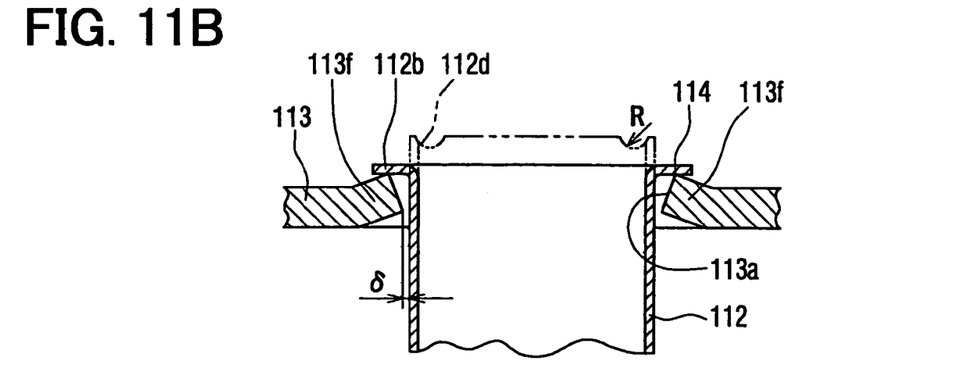
Figure 12A:
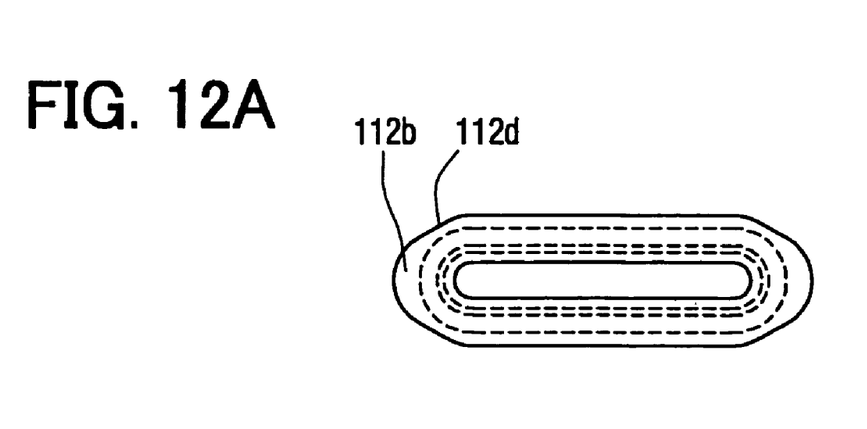
FIGS. 12A and 12B are cross-sectional views showing the tip portion of a tube and a header plate in a modified example 2 of the third embodiment.
Figure 12B:
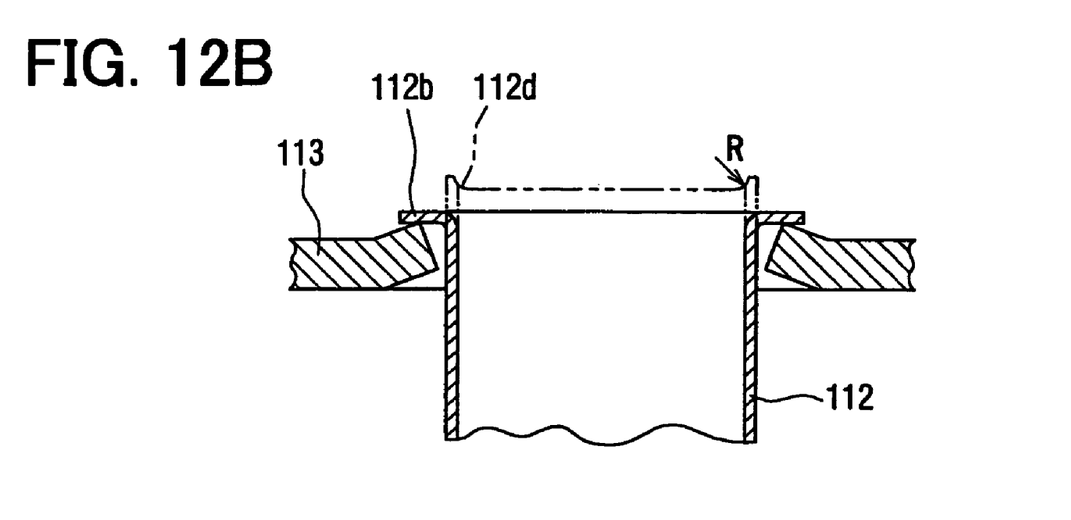

The specific shape of the cut-out portion 112d is not limited to the above-described one. As shown in FIGS. 11A, 11B, the tube 112 is cut out in the shape of a circumference having a radius R at two end portions in the direction of long diameter in the flat cross section of the tube 112 to form the cut-out portions 112d. Alternatively, as shown in FIGS. 12A, 12B, the end portion of the tube 112 in the longitudinal direction of the tube 112 can be cut out in such a way as to be tangent to a circumference having a radius R along the entire length between the opposed cut-out portions 112d shown in FIGS. 11A, 11B or in a manner similar to this. The shape of this cut-out portion 112d can be applied also to the second embodiment.

Other Embodiment

In the first embodiment to the third embodiment, the abutting portion 114 where the tube 112 is bonded to the header plate 113 is formed by forming the flange portion 112b. However, as for this abutting portion, the tube hole portion 113a can be a simple through hole or a burring hole, and a portion (insertion portion), where the tube 112 is made to abut on the header plate 113 when the tube 112 is inserted into the tube hole portion 113a, may be used as an abutting portion.

Further, the tube 112 may be a circular tube or an ellipsoidal tube in place of a flat tube.

Still further, the heater core 100 has been described as the heat exchanger of the present invention. However, the heat exchanger of the present invention can be used for a radiator for cooling an engine, a condenser for a refrigeration cycle and the like. The materials of the respective parts may be copper-based material, stainless steel, or the like in place of the aluminum alloy.

Still further, the tank body 121 does not necessarily need to be bonded to the header plate 113 by laser welding. Further, a sealing material may be interposed between the tank body 121 and the header plate 113, and a claw portion provided at the erect edge portion 113e of the header plate 113 may be caulked to bond the tank body 121 to the header plate 113.

What is claimed is:

1. A method for manufacturing a heat exchanger, the method comprising:
    inserting a tube in which a fluid flows into a plurality of plate fins each shaped like a flat plate;
    expanding the tube to mechanically connect the tube to the plate fins to form a core portion; and
    forming a tube hole portion in a header plate forming a part of a header tank, wherein the tube hole portion includes a first chamfered portion and a second chamfered portion;
    connecting an end portion of the tube in a longitudinal direction of the tube to the header plate so as to form an abutting portion, wherein the forming of the abutting portion includes:
        inserting the end portion of the tube into the tube hole portion, from a side of the first chamfered portion to a side of the second chamfered portion,
        bending an entire periphery of the inserted end portion of the tube to a flat surface of the header plate to form a flange portion, and
        abutting the flange portion to the flat surface of the header plate so as to form the abutting portion; and
        applying a predetermined load in a direction in which the flange portion abuts the header plate while vibrating the tube by supersonic vibration in a direction in which a surface of the abutting portion extends, wherein
        in the applying step, the tube is solid-boned to the header plate in a solid phase by deforming the tube and the header plate, such that a peak portion between the flat surface of the header plate and the second chamfered portion is crushed, and a material of the header plate near the tube hole portion flows to a space between the first chamfered portion and the tube.

2. The method for manufacturing a heat exchanger as in claim 1, further comprising forming a stress relieving portion for relieving a tensile stress generated in a circumferential direction at a predetermined portion along the entire periphery of the end portion of the tube in the longitudinal direction of the tube when the end portion of the tube in the longitudinal direction of the tube is bent to the flat surface of the header plate before forming the flange portion.

3. The method for manufacturing a heat exchanger as in claim 1, further comprising forming a protruding portion for reducing a contact area with the tube on the header plate in the abutting portion.

4. The method according to claim 3, wherein, the protruding portion is formed by cutting out a part of the header plate in the abutting portion.

5. The method according to claim 3, wherein:
    the protruding portion is formed such that a contact area between the tube and the header plate in an inserting direction of the tube is reduced while having a clearance between the tube and the protruding portion in a direction perpendicular to the inserting direction.

6. The method for manufacturing a heat exchanger as in claim 1, further comprising of heating a portion near the abutting portion by heating means when the tube is bonded to the header plate in the solid phase.

7. The method according to claim 1, wherein the solid-bonding is performed only using a material of the tube and a material of the header plate.

8. The method according to claim 1, wherein when the tube is inserted into the tube hole portion of the header plate, a clearance is formed between the tube and the header tank at the tube hole portion.

9. The method according to claim 1, wherein the tube is a flat tube having a cross-section defining a width greater than a thickness of the tube; and the vibrating of the tube is done in a linear direction generally parallel to the width of the tube.

* * * * *